United States Patent
Filippov et al.

(10) Patent No.: US 10,337,307 B2
(45) Date of Patent: Jul. 2, 2019

(54) OPTIMIZED ACIDIZING OF A PRODUCTION WELL NEAR AQUIFER

(71) Applicant: Landmark Graphics Corporation, Houston, TX (US)

(72) Inventors: Andrey Filippov, Houston, TX (US); Vitaly Anatolievich Khoriakov, Calgary (CA)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 277 days.

(21) Appl. No.: 15/104,164

(22) PCT Filed: Oct. 13, 2014

(86) PCT No.: PCT/US2014/060273
§ 371 (c)(1),
(2) Date: Jun. 13, 2016

(87) PCT Pub. No.: WO2015/112211
PCT Pub. Date: Jul. 30, 2015

(65) Prior Publication Data
US 2016/0312593 A1 Oct. 27, 2016

Related U.S. Application Data

(60) Provisional application No. 61/931,255, filed on Jan. 24, 2014.

(51) Int. Cl.
- *C09K 8/72* (2006.01)
- *E21B 41/00* (2006.01)
- *E21B 43/26* (2006.01)

(52) U.S. Cl.
CPC ............... *E21B 43/26* (2013.01); *C09K 8/72* (2013.01); *E21B 41/0092* (2013.01)

(58) Field of Classification Search
CPC ........ C09K 8/72; E21B 43/26; E21B 41/0092
See application file for complete search history.

(56) References Cited

U.S. PATENT DOCUMENTS

| | | | | |
|---|---|---|---|---|
| 3,123,136 A | * | 3/1964 | Sharp | C09K 8/58 166/269 |
| 3,308,885 A | * | 3/1967 | Sandiford | C09K 8/882 166/295 |

(Continued)

FOREIGN PATENT DOCUMENTS

| WO | WO 2015/016932 A1 | 2/2015 |
|---|---|---|
| WO | WO 2015/073030 A1 | 5/2015 |
| WO | WO 2015/073033 A1 | 5/2015 |

OTHER PUBLICATIONS

Schulze-Riegert et al. "Multiobjective Optimization with Application to Model Validation and Uncertainty" SPE 105313 (2007): Society of Petroleum Engineers [retrieved on Jun. 18, 2018]. Retrieved from <https://www.onepetro.org/download/conference-paper/SPE-105313-MS?id=conference-paper%2FSPE-105313-MS>.*

(Continued)

*Primary Examiner* — Aniss Chad
*Assistant Examiner* — Alfred H B Wechselberger

(57) ABSTRACT

Systems and methods for determining an optimal acid placement design for a production well near an aquifer are provided. An optimal acid placement that is determined accounts for the drawdown from heel to toe of the production well and reservoir heterogeneity to thereby address the issue of water breakthrough from the nearby aquifer and improve hydrocarbon recovery.

20 Claims, 11 Drawing Sheets

(56) References Cited

U.S. PATENT DOCUMENTS

| | | | | |
|---|---|---|---|---|
| 3,527,301 A * | 9/1970 | Raifsnider | ............ | C09K 8/607 166/270.1 |
| 5,099,924 A | 3/1992 | Gidley | | |
| 5,289,888 A | 3/1994 | Talley | | |
| 5,297,628 A | 3/1994 | Jennings | | |
| 5,431,227 A | 7/1995 | Montgomery et al. | | |
| 7,603,261 B2 * | 10/2009 | Tardy | ...................... | G06G 7/48 166/288 |
| 8,700,371 B2 * | 4/2014 | Thambynayagam | ... | E21B 43/12 166/250.15 |
| 2007/0095528 A1 * | 5/2007 | Ziauddin | .................. | E21B 43/25 166/252.3 |
| 2008/0046223 A1 * | 2/2008 | Noetinger | ............... | E21B 43/16 703/9 |
| 2008/0262735 A1 * | 10/2008 | Thigpen | .................. | E21B 43/32 702/6 |
| 2009/0294122 A1 * | 12/2009 | Hansen | .................... | E21B 43/00 166/250.01 |
| 2011/0042083 A1 * | 2/2011 | Sierra | ..................... | E21B 43/12 166/271 |
| 2014/0341755 A1 * | 11/2014 | Laing | .................... | E21B 43/121 417/53 |
| 2015/0039276 A1 * | 2/2015 | Maucec | .................. | E21B 47/10 703/2 |
| 2015/0152317 A1 * | 6/2015 | Hutchins | ............... | E21B 43/162 507/200 |

OTHER PUBLICATIONS

Abou-Sayed et al. "Well Stimulation Technology for Thick Carbonate Reservoirs" IPTC 2005, Paper No. 10647, Doha, Qatar [retrieved on Mar. 10, 2019]. Retrieved from <https://www.onepetro.org/conference-paper/IPTC-10647-MS?event-fire=false> (Year: 2005).*

Crosta et al. "Selection of Candidate Wells and Optimization of Conformance Treatment Design in the Barrancas Field using a 3D Conformance Simulator" RIO Oil and Gas 2004 Conference, Paper No. IBP09304 [retrieved on Mar. 11, 2019]. Retrieved from <https://www.osti.gov/etdeweb/servlets/purl/20978022> (Year: 2004).*

Ogunsanwo et al. "4D reservoir simulation workflow for optimizing inflow control device design" first break, vol. 20, pp. 90-93 [retrieved on Mar. 11, 2019]. Retrieved from <https://www.slb.com/~/media/Files/software/industry_articles/201205_first_break_4d_reservoir_simulation.pdf> (Year: 2012).*

Duverney, et al., "Relative-Permeability Modifiers and Their Us in Acid Stimulation in HP/HT Low-Permeability Carbonate Formations: Offshore Mexico Cases," SPE Latin American and Caribbean Petroleum Engineering Conference, Apr. 15-18, 2007, Buenos Aires, Argentina (SPE 107584).

Hill, et al., "Fluid Placement and Diversion in Matrix Acidizing," University of Tulsa Centennial Petroleum Engineering Symposium, Aug. 29-31, 1994, Tulsa, Oklahoma, USA (SPE 27982).

International Search Report and the Written Opinion of the International Search Authotity, or the Declaration, Jan. 2, 2015, PCT/US2014/060273, 16 pages, ISA/KR.

* cited by examiner

OPTIMIZED ACIDIZING OF A PRODUCTION WELL NEAR AQUIFER

CROSS-REFERENCE TO RELATED APPLICATIONS

The present application is a US. National Stage patent application of International Application No. PCT/US2014/060273, filed on Oct. 13, 2014, which claims the benefit of US. Provisional Patent Application No. 61/931,255, filed on Jan. 24, 2014, titled "Optimized Acidizing of a Production Well Near Aquifer," both of which are incorporated herein by reference in their entirety.

BACKGROUND

1. Field of the Disclosure

The present disclosure relates generally to the recovery of subterranean deposits and more specifically to methods and systems for improving production of an oil well by optimizing acidizing of a production well near aquifer.

2. Discussion of the Related Art

Matrix acidizing is a widely used technique to stimulate wells for improved inflow performance. In sandstone acidizing, an acid solution is injected into the formation to increase permeability by dissolving minerals clogging the sandstone pores and removing damage to the near-well formation during drilling and well completion processes. Acidizing can yield a substantial increase in near-well permeability and, correspondingly, higher production rates.

Modern methods of acid placement allow targeted delivery of acid to cover all of the production intervals. Usually, the goal is to achieve a uniform acid placement along the wellbore. However, due to the frictional pressure drop and reservoir permeability variations along the well, such uniform acidizing can yield non-uniform oil flux at the pipe wall and higher production flow rates at the heel. In the case of a well that lies in proximity to an aquifer, there is a high probability of water breakthrough in the heel area of a well and the well shutting off as a result.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Figure 1:
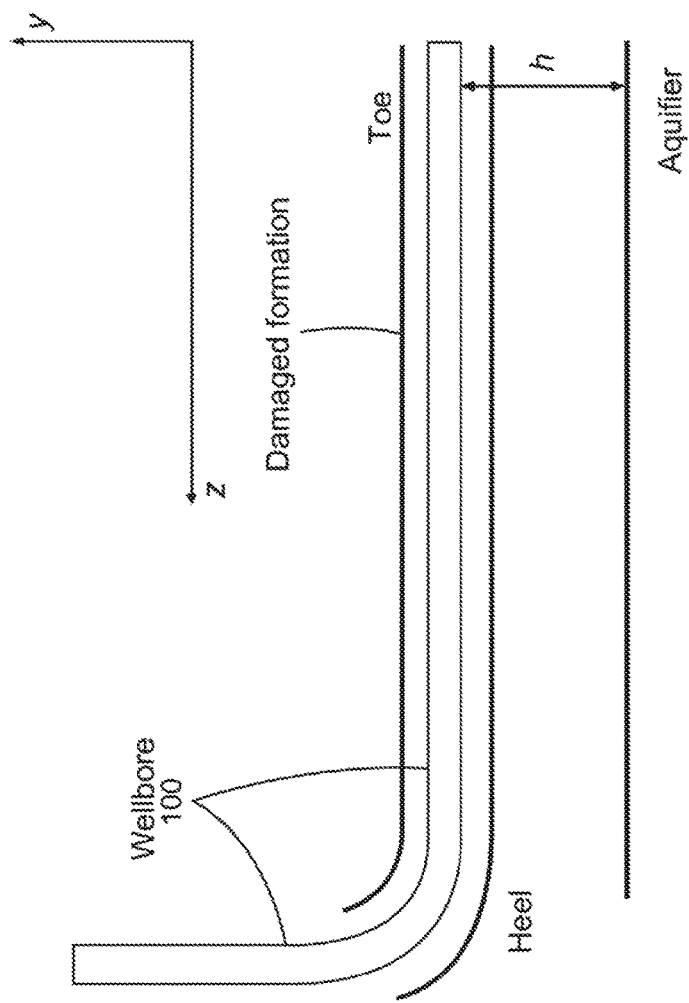
FIG. 1 is a diagram illustrating an example of a horizontal production well near an aquifer in accordance with an embodiment.

Embodiments of the present disclosure relate to determining an optimal acid placement design for acidizing a production well near an aquifer. As stated above, the frictional pressure drop in a wellbore and reservoir permeability variations typically result in non-uniform drawdown pressure along the well length and a higher production flow rate at the heel. The presence of an aquifer near the well increases the probability of water breakthrough. The breakthrough of water into the well may drastically decrease the life of the well and its production capabilities. Therefore, to improve hydrocarbon recovery and mitigate the danger of a water breakthrough, an optimal acid placement design must account for the drawdown from heel to toe of the well and reservoir heterogeneity.

As will be described in further detail below, the disclosed embodiments provide a variable, non-uniform acid placement design that accounts for the drawdown from heel to toe and reservoir heterogeneity to address the above issue of water breakthrough and thereby improve hydrocarbon recovery. For instance, in one embodiment, an algorithm and a mathematical model are provided for performing a detailed calculation of a corresponding acid placement distribution along the production length of the well that would yield a prescribed target profile of an injection and/or production rate.

The disclosed embodiments and advantages thereof are best understood by referring to FIGS. 1-10 of the drawings, with like reference numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

Referring now to FIG. 1, an example of a horizontal production well 100 in a reservoir formation near an aquifer is presented. In the example depicted in FIG. 1, a portion of the horizontal well 100 with an external radius re extends through the formation along a horizontal axis z. The formation may be, for example, a sandstone formation. As shown in FIG. 1, well 100 is situated above the aquifer initially at distance h. The formation outside the wellbore may be divided into two areas: a first area near the wellbore that is saturated with oil; and a second area near the aquifer that is saturated with water. The water in this second area may be, for example, slowly rising in the direction toward the wellbore due to a well-induced pressure gradient. Also, as shown in FIG. 1, well 100 is surrounded by a damaged layer $r<r_d$. The damaged layer may be a result of, for example, particle damage due to drilling and completions (e.g., mud solids invasion) or other causes. Because of pore clogging caused by such damage, the permeability of the damaged zone $k_d$ can be substantially lower than the permeability of undamaged formation $k_f$.

Figure 2A:
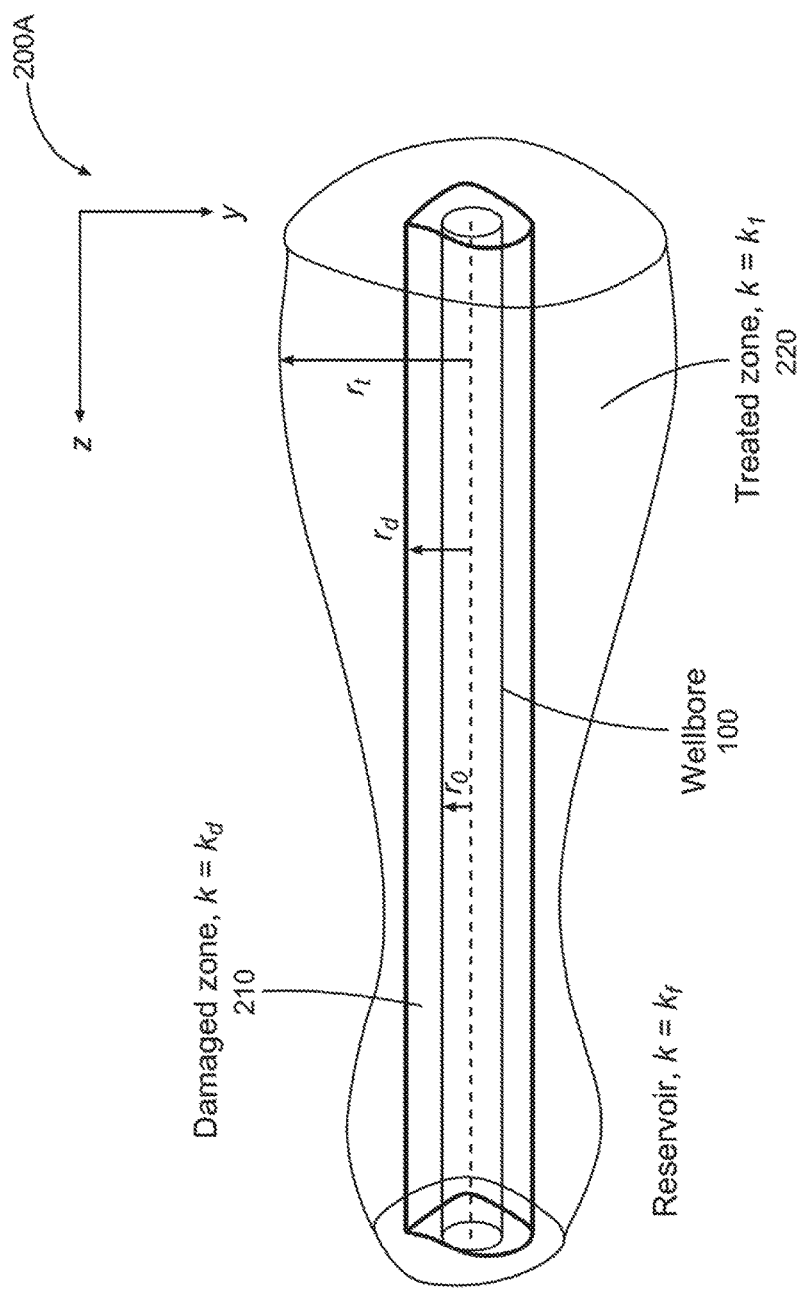
FIGS. 2A-2C are diagrams illustrating different views of an exemplary horizontal well with damaged, treated and undamaged formation zones in accordance with an embodiment.
Figure 2C:
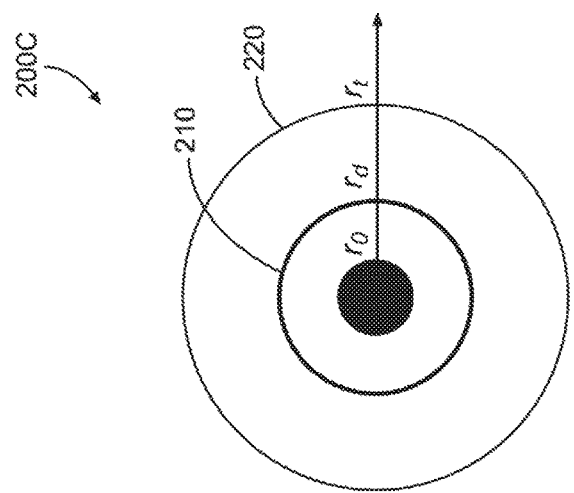
Figure 2B:
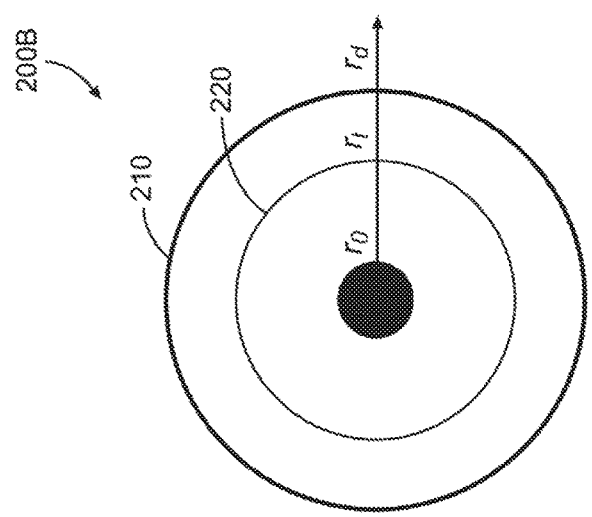

FIG. 2A shows an expanded view 200A of the formation area near the horizontal portion of the wellbore of FIG. 1. As shown in FIG. 2A, the area surrounding horizontal well 100 includes a damaged zone 210 and a treated or treatment zone 220. By definition, the formation in the surrounding area not covered by damaged zone 210 is undamaged. In an embodiment, the application of an acid under fluid injection in the treatment zone 220 ($r<r_t(z)$) may allow naturally occurring host minerals, such as carbonates, to be cleaned from the damaged rock layers and from pores in the undamaged layers of the formation.

In an embodiment, a mathematical model may be used in which the permeability of the rock matrix may be calculated as, for example, a product of the absolute permeability and relative permeability. Relative permeability may be, for example, a property of the fluid under consideration. In some implementations of the model, it may be assumed that the relative permeabilities of fluids are constant.

As a result of acidizing, permeability $k_1$ in the treatment zone 220 can be substantially higher than the initial formation permeability $k_f$. Depending on the mass of the injected acid, the treatment zone 220 can cover the damaged zone 210 only partially (rt<rd) or fully (rd<rt) and extend into the undamaged formation, as shown by cross-sectional views 200B and 200C of the formation area in FIGS. 2B and 2C, respectively.

Figure 3:
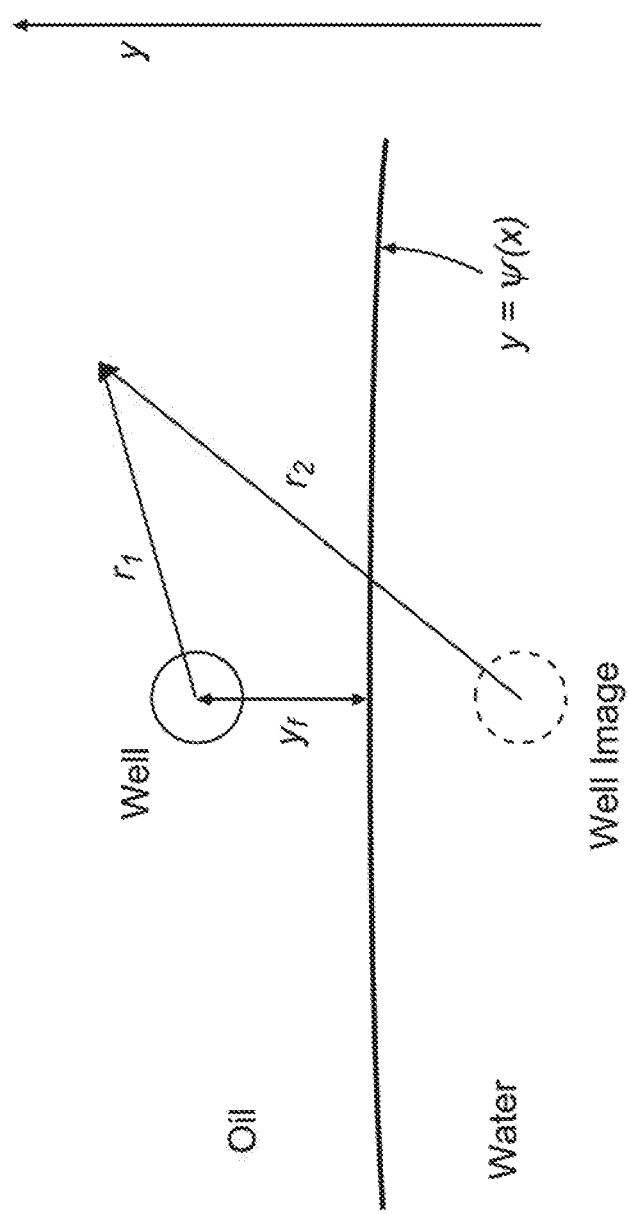
FIG. 3 is a diagram illustrating calculation of the pressure field $p_j(x,y)$ using the image method in accordance with an embodiment.

In an embodiment, the mathematical model is applied in relation to an X-Y plane, perpendicular to the horizontal axis of well 100 at some point z. Due to the linearity of using a Laplace equation to describe pressure distribution in the formation, the pressure distribution can be presented as a sum of two contributing factors:

$$p = p_j + p_g \quad (1)$$

where $p_j$ is the pressure induced by the presence of the well 100, $p_g$ is the pressure in the formation in the absence of the well, which does not contribute to the production flow. The distribution $p_j(x,y)$ can be found using standard image method techniques, e.g., based on the following set of Equations (2.1-2.4):

$$y > \psi(x): \; p_j = q\ln r_1 + q'\ln r_2 + c_1; \quad (2.1)$$

$$y < \psi(x): \; p_j = q''\ln r_1 + c_2 \quad (2.2)$$

$$q' = \frac{\alpha_o - \alpha_w}{\alpha_o + \alpha_w} q; \; q'' = \frac{2\alpha_o}{\alpha_o + \alpha_w} q \quad (2.3)$$

$$\alpha_o = \frac{k_f}{\mu_o}; \; \alpha_w = \frac{k_{wf}}{\mu_w}; \; q = \frac{\mu_o}{2\pi k_F p_o} J \quad (2.4)$$

where $\psi(x)$ is the function describing the shape of the water front, $c_1$ and $c_2$ are constants, $\alpha_o$ and $\alpha_w$ are flowing volume fractions of oil and water, respectively, $\mu_o$ and $\mu_w$ are viscosities of oil and water, respectively, $k_{wf}$ is the permeability of water in undamaged formation, $\rho_o$ is the oil density, $r_1$ and $r_2$ are distances to the point from the centers of the well 100 and its image, respectively, as shown in FIG. 3, and J is the linear density of the production mass flow. Such techniques may be similar to the method of image charges used in electrostatics to find the distribution of the electrical field of a linear charge near a dielectric plane.

If $p_B$ is the pressure at the formation boundary ($r_1=r_2=r_B$), solving Equation set (2.1-2.4) above yields Equation (3):

$$p_m - p_B = q\left[\ln\left(\frac{r_m}{r_B}\right) + \left(\frac{\alpha_o - \alpha_w}{\alpha_o + \alpha_w}\right)\ln\left(\frac{2y_f}{r_B}\right)\right]; \quad (3)$$

where $p_m$ is the value of pressure $p_j$ at distance $r_m$ from the well 100, $r_m$ is the characteristic distance from the border of the treated zone 220 to the well axis, $y_f$ is the distance between the center of well 100 and the water front, which is assumed to be larger than $r_m$. On another hand, the production flux is proportional to the difference between $p_{max}$ and pressure $p_i$ in the well 100, and effective permeability near the well 100 as follows:

$$J = \frac{2\pi p_0 k_{\text{eff}}}{\mu_o \ln\left(\frac{r_m}{r_0}\right)}(p_m - p_i) \quad (4.1)$$

$$r_t < r_d: \; k_{\text{eff}} = \ln\left(\frac{r_m}{r_0}\right)\left[\frac{1}{k_t}\ln\left(\frac{r_t}{r_0}\right) + \frac{1}{k_d}\ln\left(\frac{r_d}{r_t}\right) + \frac{1}{k_f}\ln\left(\frac{r_m}{r_d}\right)\right]^{-1} \quad (4.2)$$

$$r_t \geq r_d: \; k_{\text{eff}} = \ln\left(\frac{r_m}{r_0}\right)\left[\frac{1}{k_t}\ln\left(\frac{r_t}{r_0}\right) + \frac{1}{k_f}\ln\left(\frac{r_m}{r_t}\right)\right]^{-1} \quad (4.3)$$

Combining Equation set (4.1-4.3) above, with Equation set (2.1-2.4) and Equation (3) yields the following set of Equations (5.1-5.2) for determining the production flux:

$$J = \frac{2\pi \rho_0 k_{\text{eff}}}{\mu_o \ln\left(\frac{r_m}{r_0}\right)(1+\omega)}(p_B - p_i) \quad (5.1)$$

-continued $$\omega = \frac{k_{eff}}{k_o \ln\left(\frac{r_m}{r_0}\right)}\left[\ln\left(\frac{r_B}{r_m}\right) + \left(\frac{\alpha_o - \alpha_w}{\alpha_o + \alpha_w}\right)\ln\left(\frac{r_B}{2y_f}\right)\right] \quad (5.2)$$

The condition expressed by Equation set (5.1-5.2) above implies that the well production depends on the width of the treated zone 220 (via dependence on parameters $r_m$ and $k_{eff}$) and on the position of the water front $y_f$. Based on Equation (1), the velocity of the front propagation may be described by Equation (6) as follows:

$$\frac{dy_f}{dt} = \frac{k_w}{\Delta S_w \varphi \mu_w}\left(\frac{\partial p_j}{\partial y} + \frac{\partial p_g}{\partial y}\right) \quad (6)$$

where $\varphi$ is the formation porosity and $\Delta S_w$ is the change of the water saturation across the front. The first term in the brackets can be obtained from the image method solution in the water domain, as expressed by the second equation in Equation set (2.1-2.4). The second term in the brackets, while not related to the well production, may be postulated as in Equation (7) below to account for the hydrostatic force acting on the rising water cone:

$$\frac{\partial p_g}{\partial y} + -(\rho_w - \rho_o)g \quad (7)$$

In an embodiment, Equations (6) and (7) above may be combined with Equation set (2.1-2.4) to yield the following set of Equations (8.1-8.2) for determining the speed of the water front:

$$\frac{dy_f}{dt} = \frac{k_w}{\Delta S_w \varphi \mu_w}\left[\frac{2\alpha_o k_{eff}(p_B - p_i)}{k_o(\alpha_o + \alpha_w)\ln\left(\frac{r_m}{r_0}\right)(1+\omega)y_f} - (\rho_w - \rho_o)g\right] \quad (8.1)$$

$$t = 0: \quad y_f = -h \quad (8.2)$$

In an embodiment, the flow rate and pressure distribution in the wellbore may be determined by using the following set of Equations (9.1-9.3):

$$\frac{dq}{dz} = J; \quad q = \rho_o V A \quad (9.1)$$

$$\frac{dp_i}{dz} = -\frac{1}{2D_i}f_d \rho_o V^2 \quad (9.2)$$

$$z = 0: \quad q = 0; \quad p = p_0 \quad (9.3)$$

where V is the oil velocity, q is the mass flow rate, J is the linear density of the production flow rate, $f_d$ is the Darcy friction coefficient, and A is the flow cross-section area. In an embodiment, the axial coordinate z starts at the toe of well 100. Initial conditions at the toe of the well 100 may be described by, for example, Equation (9.3) above. In an embodiment, Equation sets (5.1-5.2), (8.1-8.2) and (9.1-9.3) may be solved to determine the evolution of the water cone height and coupled change of the production flow in the well 100. The solution may depend on a shape $r_t(z)$ of the treatment zone 220, as characterized by a function $f(z)$:

$$f(z) = \frac{1}{r_m}r_t(z) \quad (10)$$

In accordance with the disclosed embodiments, one goal of an optimized acid placement design is to find an optimal acid placement distribution, characterized by the function $f(z)$, which accounts for the drawdown from heel to toe and reservoir heterogeneity to address the issue of water breakthrough and improve hydrocarbon recovery. In an embodiment, the optimization techniques disclosed herein include determining the acid placement distribution function $f(z)$, such that the water front approaches the wellbore uniformly, e.g., simultaneously at all locations along the production part of well 100, as expressed by Equation (11):

$$t = t_m : y_f(z) = -r_m; \quad 0 \le z \le L \quad (11)$$

where $t_m$ is the particular moment in time when the water front reaches the production well, L is the production length of well 100, $r_m$ is the distance from the border of the treatment zone 220 to the well axis, as described above, and $y_f(z)$ is the distance between the center of well 100 and the water front at some point z.

In one embodiment, it is assumed that the typical treatment distance $r_m$ is much smaller than the initial distance h between well 100 and the aquifer, as shown in FIG. 1. As will be described in further detail below with respect to the exemplary method illustrated in FIG. 4, the disclosed optimization techniques use the solution of the initial-boundary value problem, as expressed by Equations sets (8.1-8.2) and (9.1-9.3), to determine the acid placement distribution function $f(z)$ such that the water front approaches the production well uniformly, as described above, and the following condition expressed by Equation (11) above is fulfilled at time $t_m$.

Figure 4:
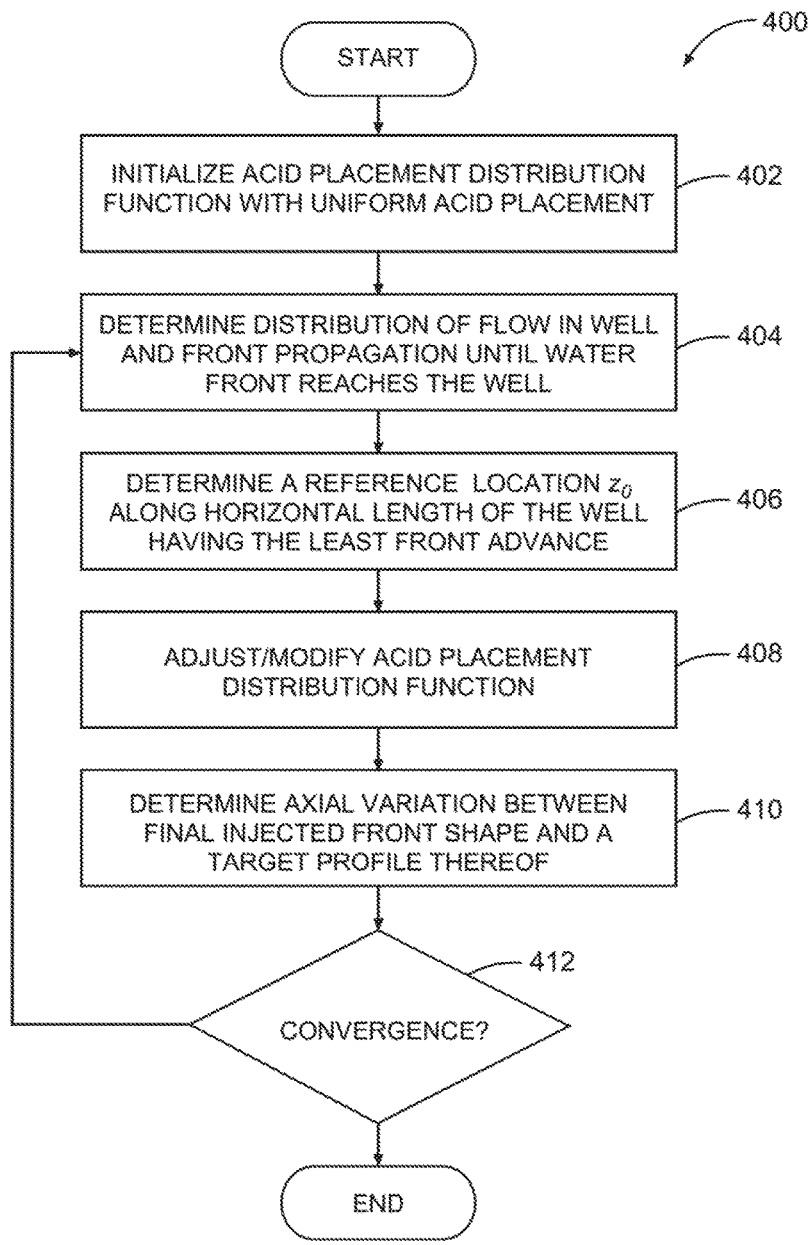
FIG. 4 is a flowchart that depicts a process configured to perform an acidizing optimization procedure in accordance with an embodiment.

FIG. 4 is a process flowchart of an exemplary method 400 for determining an optimal acid placement design for a production well that accounts for any drawdown from heel to toe and reservoir heterogeneity. Such an optimal acid placement design therefore may be used to mitigate the potential for water breakthrough from a nearby aquifer and improve hydrocarbon recovery from the well. For purposes of discussion and explanation, method 400 will be described using the horizontal well 100 and the surrounding formation, as shown in FIGS. 1 and 2 and as described above. However, method 400 is not intended to be limited thereto.

Method 400 begins in step 402 by initializing the acid placement distribution function $f(z)$ with an initial uniform acid placement profile $f(z)=1$. This assumes that the radial distance of the boundary of the treatment zone $r_t(z)$ from the well's center is constant along the horizontal length of the well, in accordance with Equation (12):

$$f(z) = f_0(z) = 1; \quad 0 \le z \le L \quad (12)$$

In step 404, the distribution of flow rate in the wellbore is determined along with the front propagation until the water front reaches the production well. In an embodiment, step 404 includes determining the evolution of the water front position $y_f(z,t)$ by performing an integration of Equation set (8.1-8.2) (e.g., using the Runge-Kutta integration method or other suitable integration methods), while the distributions of pressure and flow rate in the wellbore are calculated by performing a similar integration of Equation set (9.1-9.2). In an embodiment, the integrations are performed at each time step over a period of time that ends at time $t=t_m$, e.g., when the following condition is reached at some point z of the well:

$$y_f^n(z, t_m) = -r_m \qquad (13)$$

where n is the iteration number and the initial position of the front $y_f$ equals −h at t=0. The time integrations performed in step 404 may represent, for example, a numerical simulation for determining the time-dependent distribution of flow in the wellbore and front propagation based on solutions to Equations (1-9.3), as described above. Thus, the simulation process in this example may be initialized in step 402 using the uniform acid placement f(z)=1, as described above.

Step 406 includes determining a reference point or location z=$z_0$ along the horizontal length of the wellbore having the least front advance, e.g., where the water cone is the least advanced or the front propagation is determined to be at a minimum, in accordance with the following condition expressed using Equation (14):

$$y_f^1(z_0, t_m) = \min[y_f^1(z, t_m)]; \; 0 \le z \le L \qquad (14)$$

In an embodiment, the reference point $z_0$ and the corresponding value of the acid distribution function $f(z_0)$ remains constant or fixed for all subsequent iterations n of the analysis, as will be described in further detail below:

$$f_n(z_0) = 1; \; n=1,2, \qquad (15)$$

In step 408, the acid placement distribution function is adjusted or modified based on based on the results of the integration/simulation in step 404 relative to the reference point/location $z_0$ determined in step 406. In an embodiment, the adjustment may be performed using Equation (16):

$$f^{n+1}(z) = \left( \frac{y_f^n(z_0, t_m) + h}{y_f^n(z, t_m) + h} \right)^m f^n(z) \qquad (16)$$

where m may be a positive exponent. In an embodiment, step 408 may include, for example, decreasing values of the acid placement distribution function $f(z)$ at points where the front has advanced beyond the front's position at the reference point/location z=$z_0$.

In step 410, the axial variation Δ between a final injected front shape and a target profile for the injection flow rate/distribution along the well. For example, in one embodiment, the axial variation Δ may be determined using Equation (17):

$$\Delta = \max[y_f^n(z, t_m)] - \min[y_f^{n+1}(z, t_m)] \qquad (17)$$

In step 412, it is determined whether the axial variation determined in step 410 is within a predetermined convergence value (i.e., Δ<ε). In one embodiment, the value ε is of order $10^{-5}$. Thus, the predetermined convergence value may be, for example, $10^{-5}$ of the distance between the production well and the water front. If the variation is not within the predetermined convergence value (e.g., the condition expressed by Equation (17) above is not fulfilled), method 400 returns to step 404 and the above-described steps 404, 406, and 408 are repeated until convergence is reached, i.e., the axial variation is within the predetermined convergence value. In this way, steps 404, 406, and 408 may represent an iterative process of simulation (step 404) and adjustment (step 408) for optimizing the acid placement distribution function. Once it is determined in step 412 that the axial variation is within the predetermined convergence value (e.g., the condition expressed by Equation (17) above is fulfilled) after a certain number of iterations (e.g., 15-20 iterations), the above-described optimization process is considered to be converged and method 400 concludes after step 412. In an embodiment, once convergence is reached, the optimized acid placement distribution function $f^{n+1}(z)$ that yields the optimal acid placement for the production well may correspond to the currently adjusted acid placement distribution function from the most recent iteration of step 408.

In some implementations, the steps of method 400 may be applied to a numerical model developed based on Equation sets (8.1-8.2) and (9.1-9.3), as described above. It should be appreciated that the steps of method 400 may be implemented as an algorithm that can be applied to such a numerical model using any suitable programming language, e.g., a fourth-generation programming language used in a numerical computing environment. However, the disclosed embodiments may be implemented using any type of programming language and in any of various software applications.

To help further describe the disclosed embodiments, FIGS. 5-9 illustrate two examples that demonstrate how the disclosed embodiments can be applied in various practical situations. In the given examples, it is assumed that a horizontal production well has a diameter of approximately 0.114 m and a length of 2500 m in a sandstone formation. It is also assumed in these examples that oil has a density of 850 kg/m3 and a viscosity of 0.01 Pa s, while water has a density of 1000 kg/m3 and a viscosity of 0.001 Pa s. The well is surrounded by a damaged layer having a thickness of 0.105 m and a permeability that is 25% of the undamaged formation permeability. It is also assumed that a treatment zone in the formation surrounding the well has a width $r_t$-$r_0$ and a permeability that is double the undamaged formation permeability due to pore clean-up from acidizing. It is further assumed that the characteristic width of the treatment zone $r_m$-$r_0$ is 0.305 m. Further, for purposes of the following examples, it is assumed that the reservoir boundary pressure $p_B$ is set to a constant value of 25 bars and that an aquifer in proximity to the well is initially located at a distance of three meters below the well.

Figure 5:
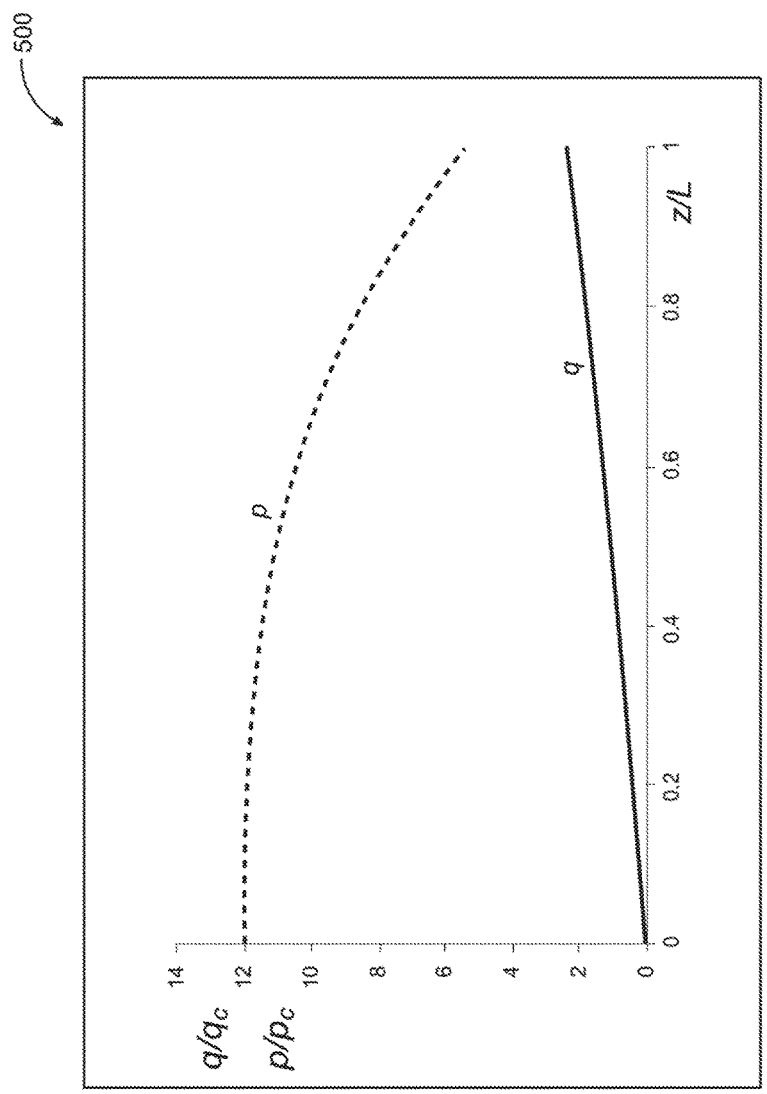
FIG. 5 is a graph that illustrates an example of a variation of pressure p and mass flow rate q along the wellbore in accordance with an embodiment.
Figure 6:
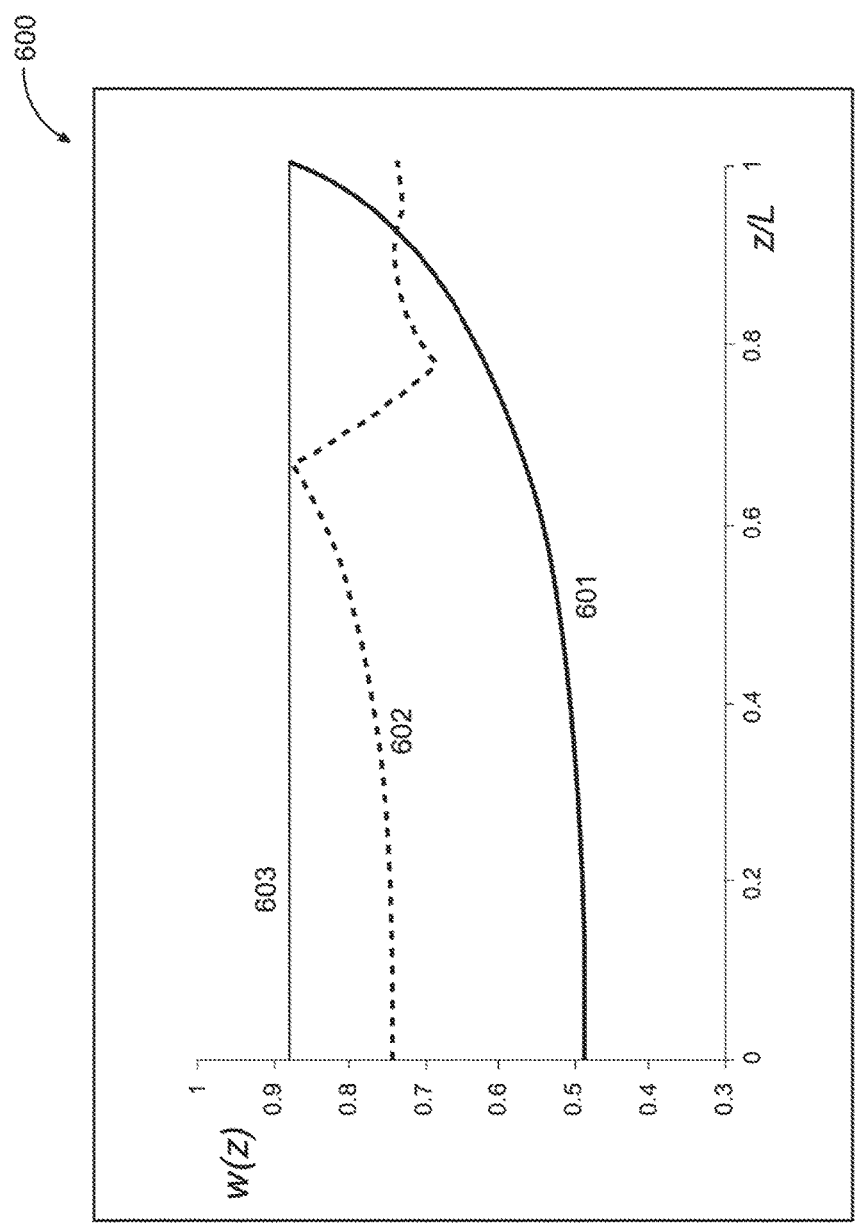
FIG. 6 is a graph that illustrates an example of a shape of the water front approaching the well with uniform acidizing after a certain number of iterations in accordance with an embodiment.
Figure 7:
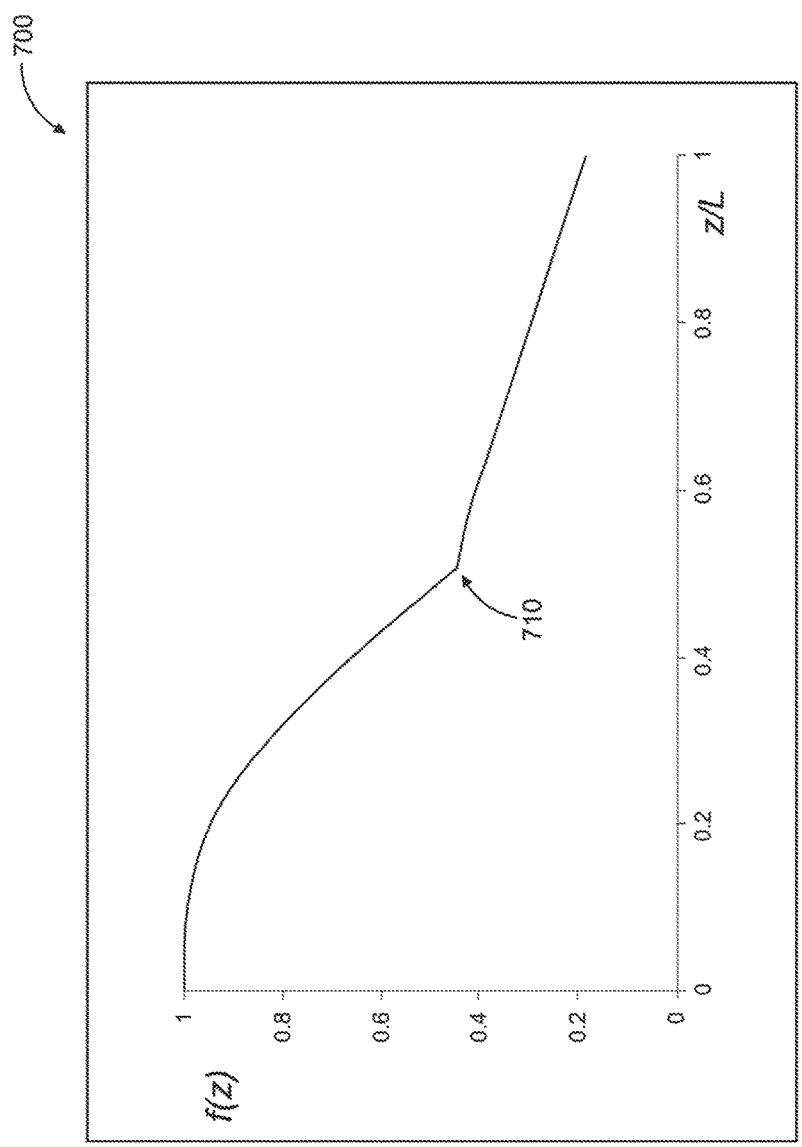
FIG. 7 is a graph that illustrates an example of an acid placement function $f(z)$ for a first example in accordance with an embodiment.

FIGS. 5-7 are used to illustrate the first example involving a horizontal production well within a uniform formation. It is assumed that the permeability of the undamaged formation in this example is a constant value, e.g., equal to 0.1 Darcy. FIG. 5 is a graph 500 showing exemplary profiles of the pressure p(z) and cumulative mass flow rate q(z) variations along the well. The data may be normalized based on, for example, corresponding values that may be characteristic to the particular well or formation in this example, e.g., a characteristic pressure $p_c$=1 bar and a characteristic mass flow rate $q_c$=19.7 kg/s. It may be assumed that the pressure drops, for example, in the direction from toe (z=0) to heel (z=L).

It may be assumed in this example that the drawdown pressure $p_B$-p increases near the heel of the well. This implies that the water front advances at a faster rate at the heel and that there is a greater risk of water flooding in this area of the well.

In an embodiment, the dimensionless shape function of the front w(z) may be defined using Equation (18) as follows:

$$w(z) = \frac{y_f(z, t_m) + h}{h} \qquad (18)$$

FIG. 6 is a graph 600 showing an exemplary shape of the water front approaching the well after different iterations of the disclosed acid placement optimization process, e.g., as described above with respect to method 400 of FIG. 4. For example, a line 601 of graph 600 may represent a uniform acid placement after the first iteration of the optimization process (e.g., step 402 of method 400 of FIG. 4, as described above). Lines 602 and 603 may represent the position or shape of the water front after four and twenty iterations, respectively. In some implementations, full convergence may be achieved within 15-20 iterations of the optimization process. The acid placement function resulting from the optimization process may correspond to, for example, a uniform final water front shape (e.g., line 603 of FIG. 6).

An example of such an optimal acid placement function $f(z)$ is shown in graph 700 of FIG. 7. The portion of graph 700 to the right of a breakpoint 710 (e.g., at approximately $z/L=0.5$) may correspond to, for example, a portion of the formation around the well in which a part of the damaged zone needs to be left untreated in order to compensate for the drawdown pressure increase in the direction of the heel.

Figure 8:
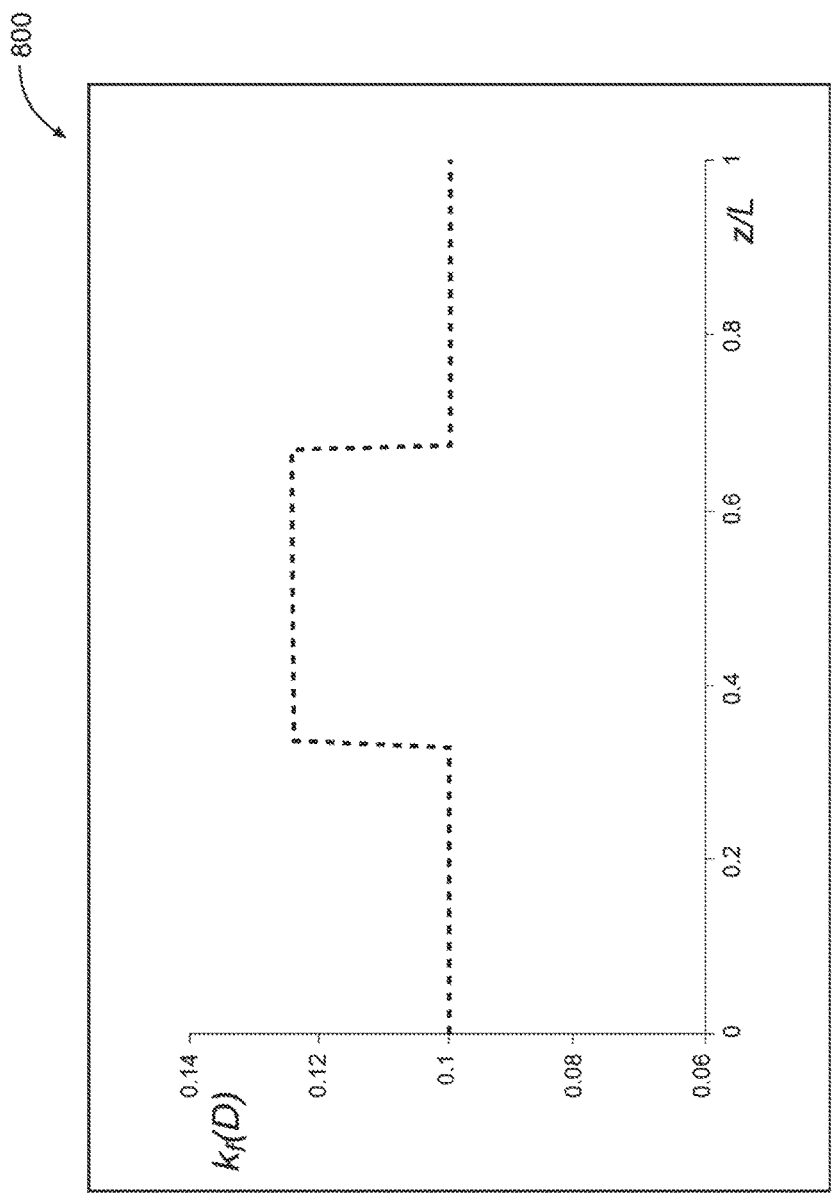
FIG. 8 is a graph that illustrates an example of non-uniform distribution of the formation permeability $k_f$ for a second example in accordance with an embodiment.
Figure 9:
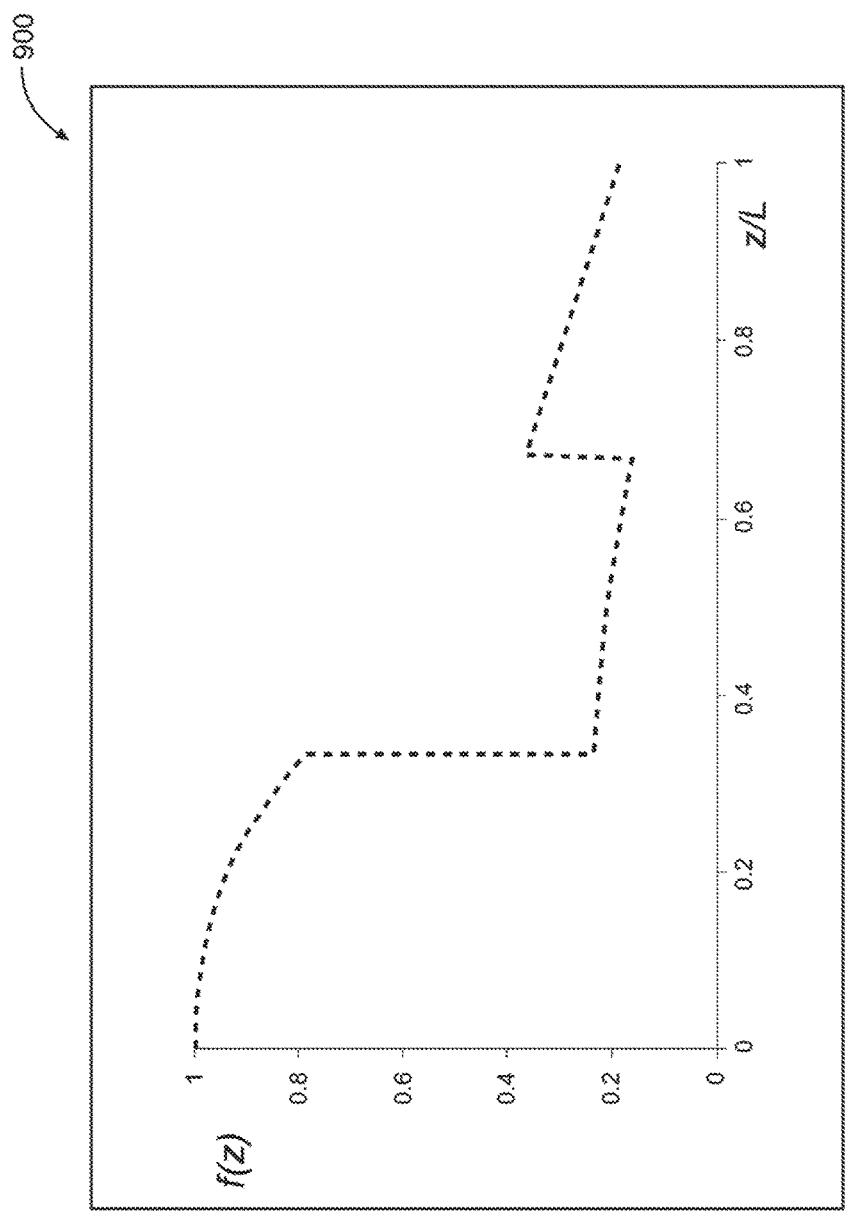
FIG. 9 is a graph that illustrates an example of the acid placement function $f(z)$, yielding a flat water front shape for the second example in accordance with an embodiment.

FIGS. 8 and 9 are used to illustrate the second example in which the disclosed embodiments may be applied to a horizontal production well in a non-uniform formation. For this example, it will be assumed that the well and formation parameters are identical to those in the first example of the uniform formation described above with respect to FIGS. 6-7, except with respect to the permeability of the undamaged zone. FIG. 8 is a graph 800 showing an exemplary distribution of the permeability $k_f$ of undamaged layers of the non-uniform reservoir formation, which varies along the length of the well in this example. The application of the techniques disclosed herein results in the acid placement function $f(z)$ shown in graph 900 of FIG. 9. The results shown in FIG. 9 indicate that very little formation acidizing is needed in the middle part of the well, where permeability is the highest, and around the heel area, where the pressure is highest.

Figure 10:
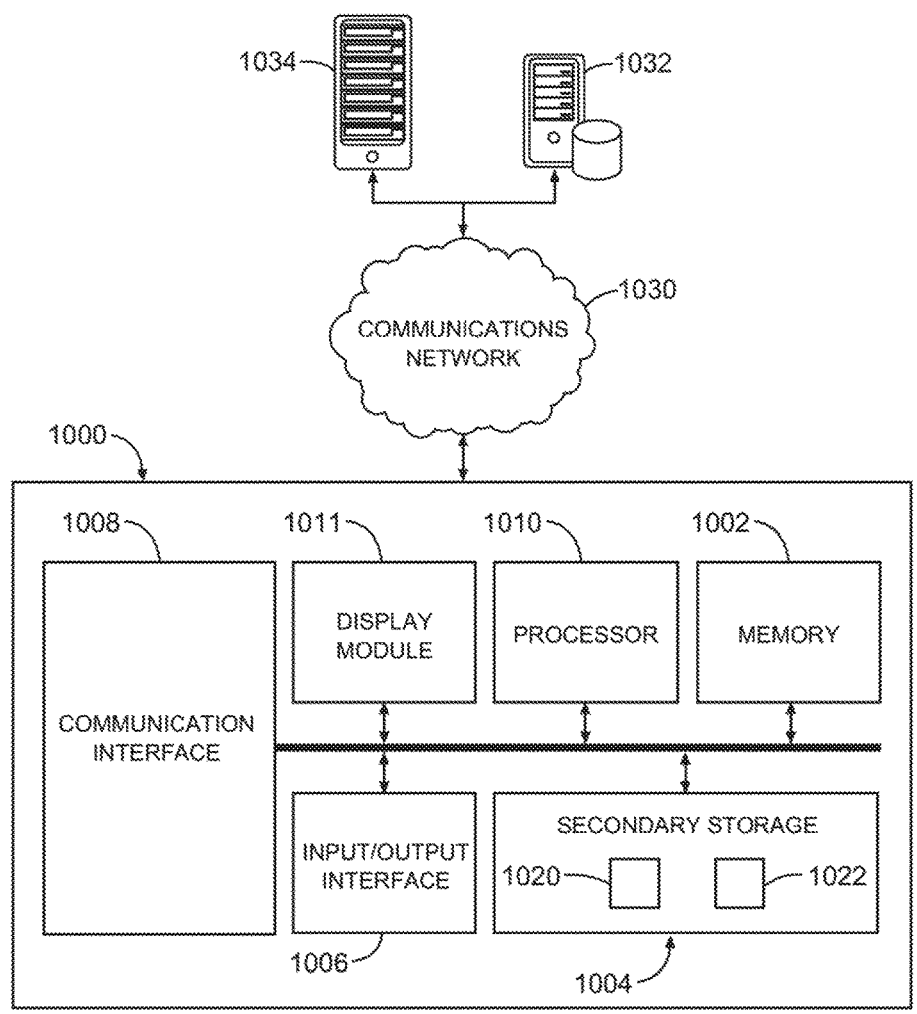
FIG. 10 is a block diagram illustrating an exemplary computer system for implementing the disclosed embodiments.

Referring now to FIG. 10, a block diagram illustrating one embodiment of a system 1000 for implementing the features and functions of the disclosed embodiments is presented. The system 1000 may be any type of computing device including, but not limited to, a desktop computer, a laptop, a server, a tablet, and a mobile device. The system 1000 includes, among other components, a processor 1010, main memory 1002, secondary storage unit 1004, an input/output interface module 1006, and a communication interface module 1008.

The processor 1010 may be any type or any number of single core or multi-core processors capable of executing instructions for performing the features and functions of the disclosed embodiments. The input/output interface module 1006 enables the system 1000 to receive user input (e.g., from a keyboard and mouse) and output information to one or more devices such as, but not limited to, printers, external data storage devices, and audio speakers. The system 1000 may optionally include a separate display module 1011 to enable information to be displayed on an integrated or external display device. For instance, the display module 1011 may include instructions or hardware (e.g., a graphics card or chip) for providing enhanced graphics, touchscreen, and/or multi-touch functionalities associated with one or more display devices.

Main memory 1002 is volatile memory that stores currently executing instructions/data or instructions/data that are prefetched for execution. The secondary storage unit 1004 is non-volatile memory for storing persistent data. The secondary storage unit 1004 may be or include any type of data storage component such as a hard drive, a flash drive, or a memory card. In one embodiment, the secondary storage unit 1004 stores the computer executable code/instructions and other relevant data for enabling a user to perform the features and functions of the disclosed embodiments.

For example, in accordance with the disclosed embodiments, the secondary storage unit 1004 may permanently store the executable code/instructions of the above-described acidizing optimization algorithm 1020. The instructions associated with the acidizing optimization algorithm 1020 are then loaded from the secondary storage unit 1004 to main memory 1002 during execution by the processor 1010 for performing the disclosed embodiments. In addition, the secondary storage unit 1004 may store other executable code/instructions and data 1022 such as, but not limited to, a wellbore simulator application and/or a reservoir simulation application for use with the disclosed embodiments.

The communication interface module 1008 enables the system 1000 to communicate with the communications network 1030. For example, the network interface module 1008 may include a network interface card and/or a wireless transceiver for enabling the system 1000 to send and receive data through the communications network 1030 and/or directly with other devices.

The communications network 1030 may be any type of network including a combination of one or more of the following networks: a wide area network, a local area network, one or more private networks, the Internet, a telephone network such as the public switched telephone network (PSTN), one or more cellular networks, and wireless data networks. The communications network 1030 may include a plurality of network nodes (not depicted) such as routers, network access points/gateways, switches, DNS servers, proxy servers, and other network nodes for assisting in routing of data/communications between devices.

For example, in one embodiment, the system 1000 may interact with one or more servers 1034 or databases 1032 for performing the features of the disclosed embodiments. For instance, the system 1000 may query the database 1032 for well log information for creating a wellbore model in accordance with the disclosed embodiments. Further, in certain embodiments, the system 1000 may act as a server system for one or more client devices or a peer system for peer to peer communications or parallel processing with one or more devices/computing systems (e.g., clusters, grids).

Thus, the disclosed embodiments provide a novel and efficient reservoir-wellbore model for optimization of acid placement on production wells, which can be applied to coupled wellbore-reservoir simulations of various complexity levels. The optimized acidizing will yield a uniform height of the approaching water cone along the well-bore. This can allow the production rates to be distributed uniformly, so that the water front approaches well uniformly, mitigating the risk of the early breakthrough. This model also considers the variation of reservoir formation parameters and fluid proper-ties, which have wide potential applications for different reservoirs. Vertical-horizontal anisotropy of permeabilities can be accounted for by using effective permeabilities.

Additionally, the disclosed acidizing optimization techniques can be a powerful tool for acid placement design and production optimization if assembled in the production simulation software package, e.g. NETool™. It should be appreciated that the disclosed techniques may be optimized for a specific set of problems and is much simpler than a universal optimization method. For example, the mathematical analysis described herein may not require the use of any Lagrange multipliers and also, such analysis may be reduced to one simulation that can run very fast. On another hand, the disclosed techniques may be easily applied to any coupled wellbore-reservoir model, including relatively more complex models than those described herein.

The foregoing methods and systems disclosed herein are particularly useful in optimizing acid treatment design for production wells near aquifers. In one embodiment of the present disclosure, a computer-implemented method for determining an optimal acid placement for a production well near an aquifer includes: initializing an acid placement distribution function based on a uniform acid placement profile; determining a distribution of inflow into the production well and a location of a water breakthrough when a water front reaches the production well during a simulation of front propagation based on the acid placement distribution function, wherein the simulation is used to determine an evolution of the water front as it approaches the production well; adjusting the acid placement distribution function based on results of the simulation relative to a reference location along a length of the production well, where the reference location corresponds to a point along the production well where the front propagation is determined to be at a minimum; determining whether a variation between a shape of the water front according to the adjusted acid placement distribution function and a target profile according to the reference location is within a predetermined convergence range; responsive to a determination that the variation is not within the predetermined convergence range, repeating the simulation and adjustment of the acid placement distribution function until the deviation is determined to be within the predetermined convergence range; and responsive to a determination that the variation is within the predetermined convergence range, determining the optimal acid placement for the production well using the adjusted acid placement distribution function.

In a further embodiment, the adjusting of the acid placement distribution function includes decreasing values of the acid placement distribution function at points where the water front has advanced beyond the reference location. the predetermined convergence value is $10^{-5}$ of the distance between the water front and the production well. In yet a further embodiment, the reference location remains fixed during subsequent iterations of the simulation and adjustment of the flow control device distribution function is performed in response to a determination that the deviation is not within the predetermined convergence range. In yet a further embodiment, the production well is within a uniform reservoir formation. In yet a further embodiment, the production well is within a non-uniform reservoir formation. In yet a further embodiment, a permeability of undamaged layers of the non-uniform reservoir formation varies along the length of the production well. In yet a further embodiment, the optimal acid placement accounts for reservoir heterogeneity and a drawdown from heel to toe of the production well. In yet a further embodiment, the optimal acid placement mitigates chances of a water breakthrough from the nearby aquifer and improves hydrocarbon recovery.

In another embodiment of the present disclosure, a system for determining optimal acid placement for a production well with a nearby aquifer includes at least one processor and a memory coupled to the processor that includes processor readable instructions stored therein, which when executed by the processor configures the processor to perform a plurality of operations, including operations to: initialize an acid placement distribution function based on a uniform acid placement profile; determine a distribution of inflow into the production well and a location of a water breakthrough when a water front reaches the production well during a simulation of front propagation based on the acid placement distribution function, wherein the simulation is used to determine an evolution of the water front as it approaches the production well; adjust the acid placement distribution function based on results of the simulation relative to a reference location along a length of the production well, the reference location corresponding to a point along the production well where the front propagation is determined to be at a minimum; determine whether a variation between a shape of the water front according to the adjusted acid placement distribution function and a target profile according to the reference location is within a predetermined convergence range; responsive to a determination that the variation is not within the predetermined convergence range, repeat the simulation and adjustment of the acid placement distribution function until the deviation is determined to be within the predetermined convergence range; and responsive to a determination that the variation is within the predetermined convergence range, determine the optimal acid placement for the production well using the adjusted acid placement distribution function.

In yet another embodiment of the present disclosure, a non-transitory computer readable medium has instructions stored therein, which when executed by a computer cause the computer to perform a plurality operations, including operations to: initialize an acid placement distribution function based on a uniform acid placement profile; determine a distribution of inflow into the production well and a location of a water breakthrough when a water front reaches the production well during a simulation of front propagation based on the acid placement distribution function, wherein the simulation is used to determine an evolution of the water front as it approaches the production well; adjust the acid placement distribution function based on results of the simulation relative to a reference location along a length of the production well, the reference location corresponding to a point along the production well where the front propagation is determined to be at a minimum; determine whether a variation between a shape of the water front according to the adjusted acid placement distribution function and a target profile according to the reference location is within a predetermined convergence range; responsive to a determination that the variation is not within the predetermined convergence range, repeat the simulation and adjustment of the acid placement distribution function until the deviation is determined to be within the predetermined convergence range; and responsive to a determination that the variation is within the predetermined convergence range, determine the optimal acid placement for the production well using the adjusted acid placement distribution function.

While specific details about the above embodiments have been described, the above hardware and software descriptions are intended merely as example embodiments and are not intended to limit the structure or implementation of the disclosed embodiments. For instance, although many other internal components of the system 1000 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

What is claimed is:

1. A computer implemented method for determining optimal acid placement for a production well with a nearby aquifer, the method comprising:
   initializing, by a computer system, an acid placement distribution function based on a uniform acid placement profile;
   simulating, by the computer system, a propagation of a water front from the aquifer to the production well due to fluid injection into an area of a formation surrounding the production well, based on the initialized acid placement distribution function;
   determining, by the computer system, a pressure distribution in the production well and a location of the water front when it reaches the production well during the simulation;
   adjusting, by the computer system, the acid placement distribution function based on the pressure distribution and the location of the water front relative to a reference location along a length of the production well, the reference location corresponding to a point along the water front where the simulated water front propagation is determined to be at a minimum;
   determining, by the computer system, whether a variation between a shape of the water front according to the adjusted acid placement distribution function and a target profile according to the reference location is within a predetermined convergence range;
   when the variation is determined not to be within the predetermined convergence range, repeating the simulation and the adjustment of the acid placement distribution function until the variation is determined to be within the predetermined convergence range;
   when the variation is determined to be within the predetermined convergence range, determining an acid placement distribution along the production well that yields the optimal acid placement for the production well, based on the adjusted acid placement distribution function; and
   acidizing the production well according to the determined acid placement distribution.

2. The method of claim 1, wherein adjusting the acid placement distribution function comprises:
   decreasing values of the acid placement distribution function at points where the water front has advanced beyond the reference location.

3. The method of claim 1, wherein the predetermined convergence range is within $10^{-5}$ of a distance between the shape of the waterfront and the production well.

4. The method of claim 1, wherein the reference location remains fixed during subsequent iterations of the simulation and adjustment of the acid placement distribution function is performed in response to a determination that the variation is not within the predetermined convergence range.

5. The method of claim 1, wherein the production well is within a uniform reservoir formation.

6. The method of claim 1, wherein the production well is within a non-uniform reservoir formation.

7. The method of claim 6, wherein a permeability of undamaged layers of the non-uniform reservoir formation varies along the length of the production well.

8. The method of claim 1, wherein the optimal acid placement accounts for reservoir heterogeneity and a drawdown from heel to toe of the production well.

9. The method of claim 8, wherein the optimal acid placement mitigates chances of a water breakthrough from the nearby aquifer and improves hydrocarbon recovery.

10. A system for determining optimal acid placement for a production well with a nearby aquifer, the system comprising:
    at least one processor; and
    a memory coupled to the processor including processor readable instructions stored therein, which when executed by the processor causes the processor to perform a plurality of operations, including operations to:
    initialize an acid placement distribution function based on a uniform acid placement profile;
    simulate a propagation of a water front from the aquifer to the production well due to fluid injection into an area of a formation surrounding the production well, based on the initialized acid placement distribution function;
    determine a pressure distribution in the production well and a location of the water front when it reaches the production well during the simulation;
    adjust the acid placement distribution function based on the pressure distribution and the location of the water front relative to a reference location along a length of the production well, the reference location corresponding to a point along the water front where the simulated water front propagation is determined to be at a minimum;
    determine whether a variation between a shape of the water front according to the adjusted acid placement distribution function and a target profile according to the reference location is within a predetermined convergence range;
    when the variation is determined not to be within the predetermined convergence range, repeat the simulation and the adjustment of the acid placement distribution function until the variation is determined to be within the predetermined convergence range; and
    when the variation is determined to be within the predetermined convergence range, determine an acid placement distribution along the production well that yields the optimal acid placement for the production well, based on the adjusted acid placement distribution function, wherein acidizing of the production well is performed according to the determined acid placement distribution.

11. The system of claim 10, wherein the adjustment operation performed by the processor includes operations to:
decrease values of the acid placement distribution function at points where the water front has advanced beyond the reference location.

12. The system of claim 10, wherein the predetermined convergence range is within $10^{-5}$ of a distance between the shape of the water front and the production well.

13. The system of claim 10, wherein the reference location remains fixed during subsequent iterations of the simulation and adjustment of the acid placement distribution function is performed in response to a determination that the variation is not within the predetermined convergence range.

14. The system of claim 10, wherein the production well is within a uniform reservoir formation.

15. The system of claim 10, wherein the production well is within a non-uniform reservoir formation.

16. The system of claim 15, wherein a permeability of undamaged layers of the non-uniform reservoir formation varies along the length of the production well.

17. The system of claim 10, wherein the optimal acid placement accounts for reservoir heterogeneity and a drawdown from heel to toe of the production well.

18. The system of claim 17, wherein the optimal acid placement mitigates chances of a water breakthrough from the nearby aquifer and improves hydrocarbon recovery.

19. A computer-readable storage medium having instructions stored therein, which when executed by a computer cause the computer to perform a plurality of operations, including operations to:
initialize an acid placement distribution function based on a uniform acid placement profile;
simulate a propagation of a water front from the aquifer to the production well due to fluid injection into an area of a formation surrounding the production well, based on the initialized acid placement distribution function;
determine a pressure distribution in the production well and a location of the water front when it reaches the production well during the simulation;
adjust the acid placement distribution function based on the pressure distribution and the location of the water front relative to a reference location along a length of the production well, the reference location corresponding to a point along the water front where the simulated water front propagation is determined to be at a minimum;
determine whether a variation between a shape of the water front according to the adjusted acid placement distribution function and a target profile according to the reference location is within a predetermined convergence range;
when the variation is determined not to be within the predetermined convergence range, repeat the simulation and adjustment of the acid placement distribution function until the variation is determined to be within the predetermined convergence range; and
when the variation is determined to be within the predetermined convergence range, determine an acid placement distribution along the production well that yields the optimal acid placement for the production well, based on the adjusted acid placement distribution function, wherein acidizing of the production well is performed according to the determined acid placement distribution.

20. The computer-readable storage medium of claim 19, wherein the adjustment operation performed by the processor includes operations to:
decrease values of the acid placement distribution function at points where the water front has advanced beyond the reference location.

* * * * *

UNITED STATES PATENT AND TRADEMARK OFFICE
CERTIFICATE OF CORRECTION

PATENT NO. : 10,337,307 B2
APPLICATION NO. : 15/104164
DATED : July 2, 2019
INVENTOR(S) : Andrey Filippov and Vataly Anatolievich Khoriakov It is certified that error appears in the above-identified patent and that said Letters Patent is hereby corrected as shown below:

Column 4, Lines 17 and 18, change:

" $\alpha_o = \dfrac{k_f}{\mu_o}; \alpha_w = \dfrac{k_{wf}}{\mu_w}; q = \dfrac{\mu_o}{2\pi k_F p_o} J$ (2.4) "

To:

-- $\alpha_o = \dfrac{k_f}{\mu_o}; \quad \alpha_w = \dfrac{k_{wf}}{\mu_w}; \quad q = \dfrac{\mu_o}{2\pi k_f \rho_o} J$ (2.4) --

Column 7, Line 23, change:

" $f_n(z_0)=1; n=1,2,$ (15)"

To:
-- $f_n(z_0) = 1; \quad n = 1,2,...$ (15)--

Signed and Sealed this
Twenty-sixth Day of November, 2019

Andrei Iancu
*Director of the United States Patent and Trademark Office*